United States Patent
Sharma et al.

(10) Patent No.: US 12,010,575 B2
(45) Date of Patent: Jun. 11, 2024

(54) COMMUNICATIONS WITH NON-TERRESTRIAL NETWORKS

(71) Applicant: Sony Corporation, Tokyo (JP)

(72) Inventors: Vivek Sharma, Basingstoke (GB); Yuxin Wei, Basingstoke (GB); Hideji Wakabayashi, Basingstoke (GB); Samuel Asangbeng Atungsiri, Basingstoke (JP)

(73) Assignee: SONY CORPORATION, Tokyo (JP)

( * ) Notice: Subject to any disclaimer, the term of this patent is extended or adjusted under 35 U.S.C. 154(b) by 476 days.

(21) Appl. No.: 17/268,086

(22) PCT Filed: Aug. 15, 2019

(86) PCT No.: PCT/EP2019/071929
§ 371 (c)(1),
(2) Date: Feb. 12, 2021

(87) PCT Pub. No.: WO2020/038824
PCT Pub. Date: Feb. 27, 2020

(65) Prior Publication Data
US 2021/0329518 A1   Oct. 21, 2021

(30) Foreign Application Priority Data
Aug. 20, 2018   (EP) .................................. 18189822

(51) Int. Cl.
*H04W 4/00*      (2018.01)
*H04W 36/00*     (2009.01)
(Continued)

(52) U.S. Cl.
CPC ....... *H04W 36/08* (2013.01); *H04W 36/0061* (2013.01); *H04W 36/32* (2013.01); *H04W 48/16* (2013.01); *H04W 84/06* (2013.01)

(58) Field of Classification Search
CPC . H04W 36/08; H04W 36/0061; H04W 36/32; H04W 48/16; H04W 84/06;
(Continued)

(56) References Cited

U.S. PATENT DOCUMENTS 5,809,396 A * 9/1998 Armbruster ........ H04B 7/18558
455/12.1
6,609,002 B1 * 8/2003 Krishnamurthy ..... H04W 40/12
455/12.1
(Continued)

FOREIGN PATENT DOCUMENTS

CN      105190378 A    12/2015
EP      0616437 A1      9/1994
(Continued)

OTHER PUBLICATIONS

International Search Report and Written Opinion dated Nov. 6, 2019, received for PCT Application PCT/EP2019/071929, Filed on Aug. 15, 2019, 9 pages.
(Continued)

*Primary Examiner* — Amancio Gonzalez
(74) *Attorney, Agent, or Firm* — XSENSUS LLP (57) ABSTRACT

A method for an infrastructure equipment of a wireless communications network, the method comprising receiving a request to establish a connection from a communications device in a first cell; and in response to receiving the request, selecting a second cell to be a next serving cell for the communications device and transmitting an indication of an identity of the second cell to the communications device.

18 Claims, 4 Drawing Sheets

(51) Int. Cl.
  *H04W 36/08* (2009.01)
  *H04W 36/32* (2009.01)
  *H04W 48/16* (2009.01)
  *H04W 84/06* (2009.01)

(58) Field of Classification Search
  CPC ... H04W 48/12; H04W 84/005; H04W 16/28; H04W 36/0085; H04W 76/27; H04B 7/18504
  USPC .......................................................... 370/331
  See application file for complete search history.

(56) References Cited

U.S. PATENT DOCUMENTS

| | | | |
|---|---|---|---|
| 6,842,620 B2* | 1/2005 | Smith | G08G 1/0104 455/457 |
| 7,254,409 B2* | 8/2007 | Sato | H04L 12/1868 370/335 |
| 7,697,940 B2* | 4/2010 | Jung | H04W 36/0016 455/452.2 |
| 8,155,041 B2* | 4/2012 | Hong | H04W 36/0016 455/440 |
| 8,265,685 B2* | 9/2012 | Vikberg | H04J 11/0093 455/410 |
| 8,428,595 B2* | 4/2013 | Kazmi | H04W 36/00835 455/442 |
| 8,660,528 B2* | 2/2014 | Mahalingam | H04W 48/02 455/410 |
| 8,806,521 B2* | 8/2014 | Keen | H04N 21/47202 725/23 |
| 8,837,321 B2* | 9/2014 | Henttonen | H04W 36/00835 455/437 |
| 8,964,643 B2* | 2/2015 | Lee | H04W 48/18 370/328 |
| 9,003,454 B2* | 4/2015 | Keen | H04N 21/2146 725/77 |
| 9,025,536 B2* | 5/2015 | Krishnaswamy | H04W 72/542 370/329 |
| 9,143,738 B2* | 9/2015 | Keen | H04N 21/4126 |
| 9,167,618 B2* | 10/2015 | Brisebois | H04W 4/50 |
| 9,301,211 B2* | 3/2016 | Baillargeon | H04W 36/22 |
| 9,344,405 B1* | 5/2016 | Khazan | H04W 12/04 |
| 9,392,421 B2* | 7/2016 | Subbaramoo | H04M 1/66 |
| 9,408,118 B2* | 8/2016 | Karimli | H04W 36/0061 |
| 9,516,352 B2* | 12/2016 | Keen | H04N 21/2146 |
| 9,560,099 B2* | 1/2017 | Lindner | H04W 4/08 |
| 9,674,694 B2* | 6/2017 | Subbaramoo | H04W 12/02 |
| 9,723,647 B2* | 8/2017 | Yu | H04W 76/19 |
| 9,763,149 B2* | 9/2017 | Kim | H04W 36/0085 |
| 9,949,076 B2* | 4/2018 | Harrow | H04W 68/02 |
| 10,009,093 B2* | 6/2018 | Purkayastha | H04B 7/2041 |
| 10,045,346 B1* | 8/2018 | Marupaduga | H04W 72/51 |
| 10,070,347 B2* | 9/2018 | Manepalli | H04W 36/00224 |
| 10,123,355 B2* | 11/2018 | Youtz | H04W 74/0833 |
| 10,257,078 B2* | 4/2019 | Faccin | H04L 45/22 |
| 10,264,520 B2* | 4/2019 | Jeong | H04W 36/0083 |
| 10,292,058 B2* | 5/2019 | Ansari | H01Q 1/32 |
| 10,375,718 B2* | 8/2019 | Manolakos | H04W 76/28 |
| 10,511,967 B2* | 12/2019 | Kang | H04L 63/205 |
| 10,542,414 B2* | 1/2020 | Kim | H04W 8/08 |
| 10,667,090 B2* | 5/2020 | Edge | H04W 4/029 |
| 10,681,704 B2* | 6/2020 | Lee | H04W 8/24 |
| 10,735,957 B2* | 8/2020 | Saily | H04W 12/04 |
| 10,764,815 B2* | 9/2020 | Park | H04W 48/20 |
| 10,778,449 B2* | 9/2020 | Gage | H04W 74/0833 |
| 10,813,160 B2* | 10/2020 | Xu | H04W 68/005 |
| 10,861,119 B2* | 12/2020 | Keen | G06Q 10/107 |
| 10,880,819 B2* | 12/2020 | Van Der Velde | H04W 48/14 |
| 10,924,915 B2* | 2/2021 | Dimou | H04W 8/08 |
| 11,071,018 B2* | 7/2021 | Ryoo | H04W 76/20 |
| 11,382,168 B2* | 7/2022 | Xu | H04W 76/10 |
| 11,589,220 B2* | 2/2023 | Xu | H04W 76/27 |
| 2008/0117875 A1* | 5/2008 | Bennett | H04W 36/32 370/331 |
| 2010/0323663 A1 | 12/2010 | Vikberg | |
| 2014/0123249 A1* | 5/2014 | Davis | H04W 12/06 726/5 |
| 2014/0135018 A1 | 5/2014 | Hedberg | |
| 2014/0162635 A1* | 6/2014 | Cui | H04W 48/18 455/434 |
| 2017/0026965 A1* | 1/2017 | Ode | H04W 48/10 |
| 2017/0201923 A1* | 7/2017 | Yang | H04L 43/16 |
| 2018/0192339 A1 | 7/2018 | Mirra | |
| 2018/0206070 A1* | 7/2018 | Harrow | H04L 67/54 |

FOREIGN PATENT DOCUMENTS

| | | |
|---|---|---|
| EP | 0637142 A1 | 2/1995 |
| JP | 2008035287 A | 2/2008 |
| JP | 2014239529 A | 12/2014 |
| JP | 2018033025 A | 3/2018 |
| JP | 2018033089 A | 3/2018 |
| WO | WO-2009054311 A1 | 4/2009 |
| WO | 2009/099362 A1 | 8/2009 |
| WO | WO-2018002416 A1 | 1/2018 |
| WO | WO-2018143868 A1 | 8/2018 |
| WO | 2020/030713 A2 | 2/2020 |

OTHER PUBLICATIONS

Nortel Networks, "Correction of UE Positioning", 3GPP TSG-RAN WG2 Meeting #25, Tdoc R2-012756, Nov. 26-30, 2001, pp. 1-97.
3GPP, "Study on New Radio (NR) to Support Non Terrestrial Networks", 3GPP TR 38.811, V0.3.0, Dec. 2017, pp. 1-56.
Holma et al., "LTE for UMTS OFDMA and SC-FDMA Based Radio Access", John Wiley and Sons, 2009, pp. 25-27.
3GPP, "Study on Solutions Evaluation for NR to Support Non Terrestrial Network", 3GPP TSG RAN meeting #80, RP-181370, La Jolla, USA, Jun. 11-14, 2018, 5 pages.

* cited by examiner

COMMUNICATIONS WITH NON-TERRESTRIAL NETWORKS

CROSS-REFERENCE TO RELATED APPLICATIONS

The present application is based on PCT filing PCT/EP2019/071929, filed Aug. 15, 2019, which claims the priority to EP 18189822.2, filed Aug. 20, 2018, the entire contents of each are incorporated herein by reference.

BACKGROUND

Field

The present disclosure relates to communications devices, infrastructure equipment and methods for the cell change of a communications device in a cell of a wireless communications network provided by a non-terrestrial network part.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the third generation partnership project (3GPP) defined UMTS and Long Term Evolution (LTE) architectures, are able to support a wider range of services than simple voice and messaging services offered by previous generations of mobile telecommunication systems. For example, with the improved radio interface and enhanced data rates provided by LTE systems, a user is able to enjoy high data-rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems.

Future wireless communications networks will therefore be expected to routinely and efficiently support communications with a wider range of devices associated with a wider range of data traffic profiles and types than current systems are optimised to support. For example it is expected that future wireless communications networks will efficiently support communications with devices including reduced complexity devices, machine type communication (MTC) devices, high resolution video displays, virtual reality headsets and so on. Some of these different types of devices may be deployed in very large numbers, for example low complexity devices for supporting the "Internet of Things", and may typically be associated with the transmission of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes so-called "non-terrestrial networks", or NTN for short. The 3GPP has proposed in Release 15 of the 3GPP specifications to develop technologies for providing coverage by means of one or more antennas mounted on an airborne or space-borne vehicle [1].

Non-terrestrial networks may provide service in areas that cannot be covered by terrestrial cellular networks (i.e. those where coverage is provided by means of land-based antennas), such as isolated or remote areas, on board aircraft or vessels) or may provide enhanced service in other areas. The expanded coverage that may be achieved by means of non-terrestrial networks may provide service continuity for machine-to-machine (M2M) or 'internet of things' (IoT) devices, or for passengers on board moving platforms (e.g. passenger vehicles such as aircraft, ships, high speed trains, or buses). Other benefits may arise from the use of non-terrestrial networks for providing multicast/broadcast resources for data delivery.

The use of different types of network infrastructure equipment and requirements for coverage enhancement give rise to new challenges for efficiently handling communications in wireless telecommunications systems that need to be addressed.

SUMMARY

The present disclosure can help address or mitigate at least some of the issues discussed above.

According to the present technique there is provided a method for an infrastructure equipment of a wireless communications network, the method comprising receiving a request to enter a connected mode from a communications device in a first cell; and in response to receiving the request, selecting a second cell to be a next serving cell for the communications device and transmitting an indication of an identity of the second cell to the communications device.

Embodiments of the present technique can provide an arrangement which may distribute mobility procedure signalling more evenly over time and/or may reduce a peak rate of mobility-related signalling.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
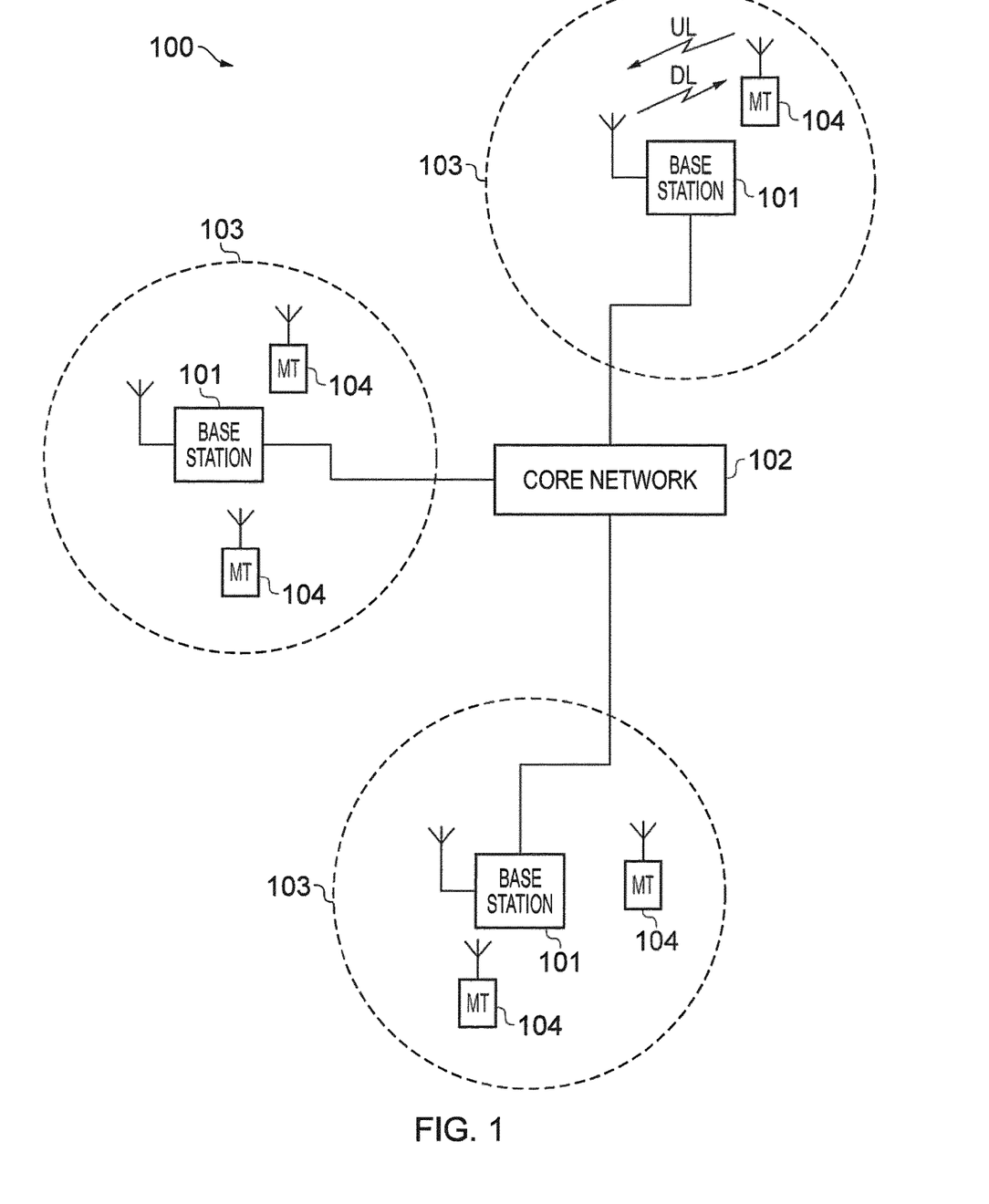
FIG. 1 schematically represents some aspects of a LTE-type wireless telecommunication system which may be configured to operate in accordance with example embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from terminal devices 104. Data is transmitted from the base stations 101 to the terminal devices 104 within their respective coverage areas 103 via a radio downlink. Data is transmitted from the terminal devices 104 to the base stations 101 via a radio uplink. The core network part 102 routes data to and from the terminal devices 104 via the respective base stations 101 and provides functions such as authentication, mobility management, charging and so on. Terminal devices may also be referred to as mobile stations, user equipment (UE), user terminals, mobile radios, communications devices, and so forth. Base stations, which are an example of network infrastructure equipment/network access nodes, may also be referred to as transceiver stations/nodeBs/e-nodeBs, g-nodeBs and so forth. In this regard different terminology is often associated with different generations of wireless telecommunications systems for elements providing broadly comparable functionality. However, example embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

Figure 2:
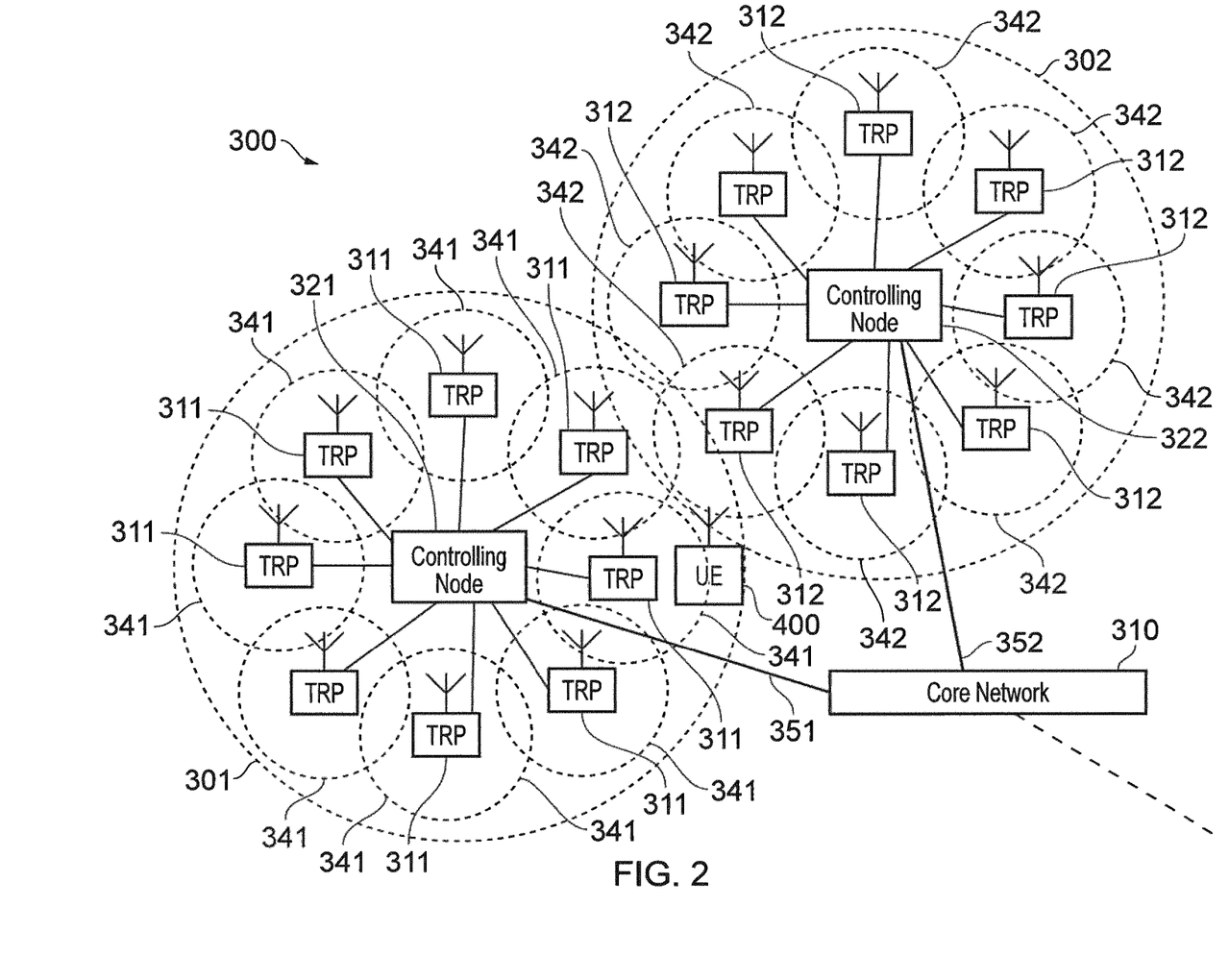
FIG. 2 schematically represents some example aspects of a new radio access technology (RAT) wireless communications network which may be configured to operate in accordance with embodiments of the present disclosure.

FIG. 2 is a schematic diagram illustrating a network architecture for a new RAT wireless communications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302.

In terms of broad top-level functionality, the core network component 310 of the new RAT communications network represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated that the subset of the distributed units in a cell which are currently active for a terminal device will depend, at least in part, on the location of the terminal device within the cell (since this contributes significantly to the radio channel conditions that exist between the terminal device and respective ones of the distributed units).

In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein.

In this regard, example embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 321, 322 and/or a TRP 311, 312 of the kind shown in FIG. 2 which is adapted to provide functionality in accordance with the principles described herein.

In wireless telecommunications networks, such as LTE type or 5G type networks, there are different Radio Resource Control (RRC) modes for terminal devices. For example, it is common to support an RRC idle mode (RRC_IDLE) and an RRC connected mode (RRC_CONNECTED). A terminal device in the idle mode may transition to the RRC connected mode, for example because it needs to transmit uplink data or respond to a paging request, by undertaking a random access procedure. The random access procedure involves the terminal device transmitting a preamble on a physical random access channel (RACH) and so the procedure is commonly referred to as a RACH or PRACH procedure/process.

Thus a conventional way for a terminal device (UE) in the RRC idle mode to exchange data with a network involves the terminal device first performing an RRC connection procedure (random access procedure) with the network. The RRC connection procedure involves the UE initially transmitting a random access request message (which may be triggered autonomously by the UE determining it has data to transmit to the network or in response to the network instructing the UE to connect to the network). This is followed by RRC control message exchange between the network and UE, comprising a "Message 2", or Random Access Response message, a "Message 3", transmitted by the UE and including an RRC message transmitted by the UE requesting the establishment, re-establishment, or resumption of an RRC connection, and a "Message 4" transmitted by the network, comprising an RRC message sent in response to the "Message 3". As will be appreciated, a large number of different possible Message 3 and Message 4 messages can be used as part of a RACH procedure. As part of the random access procedure, contention resolution may be used to avoid the possibility that multiple communications devices determine that they have successfully established an RRC connection; to this end, each Message 3 may include an identifier of the communications device, and the Message 4 may include the identifier corresponding to the communications device which is successful.

The Message 3 may comprise a non-access stratum (NAS) message having as its intended destination a core network entity. For example, the NAS message may be an initial user equipment (UE) message.

After establishing an RRC connection and exchanging the relevant data, the UE may then perform RRC disconnection and move back into idle mode for power saving.

A wireless telecommunications network, such as a 5G (NR) network may support an RRC Inactive (RRC_INACTIVE) mode, in which, as in the RRC idle mode, it may not transmit data, but must transition to the RRC connected mode in order to transmit or receive data. In both the RRC Inactive and RRC Idle modes, mobility (i.e. change of serving cell) is by means of UE-based cell reselection in accordance with parameters transmitted by the wireless telecommunications network. In the RRC connected mode, mobility may be network-controlled; that is, a handover may be initiated by an infrastructure equipment of the network. The handover may be conventionally initiated in response to, for example, measurement reports transmitted by the terminal device, which may indicate the result of measurements of downlink signals transmitted by the network in both the serving cell and one or more neighbour (candidate) cells.

Measurements by a communications device of signals transmitted by infrastructure equipment which is generating a cell other than the serving cell of the communications device may be used to detect whether a communications device is within, or close to, a coverage area of the different cell. Such signals may comprise an indication of the cell's identity, so that the communications device is able to determine which cell or cell(s) the transmissions correspond to, if the signals of multiple cells are transmitted on the same frequency.

In addition to measurements to determine whether the communications device is within or near the coverage of a non-serving cell, the communications device may perform measurements of signals transmitted by its serving cell in order to assess whether the current serving cell remains appropriate.

Measurements may be made in an idle mode (where the device is not actively transmitting or receiving data, and may not have an active connection with the infrastructure associated with the serving cell) for the purposes of autonomous (i.e. device-controlled) mobility. Measurements may be additionally or alternatively made in a connected mode (where the device is actively transmitting or receiving data, and may have an active connection with the infrastructure equipment associated with the serving cell). Results of the measurements made in connected mode may be transmitted to the serving infrastructure equipment in order to permit the wireless communications network to determine whether a cell change is necessary (and if so, to which new cell) and thus to initiate a network-controlled mobility procedure.

To support these measurements, infrastructure equipment may transmit reference signals in each cell continuously or periodically according to a pre-determined transmission schedule on a frequency (or in a band, centred on a frequency) which is configured by the wireless communications network operator.

Measurements (including decoding, where applicable) of such signals can consume a significant amount of power, thus affecting battery life of a battery-powered communications device. In general, power consumption associated with such measurements may be more dependent on the number of distinct frequencies on which the signals are to be received and decoded than on the number of cells which are measured.

If the communications device is performing measurements of its serving cell in any case, then the additional power consumption required to detect and measure additional cells which use the same frequency as the serving cell may be lower than the additional power consumption required to measure signals of other cells which are transmitted on different frequencies.

Conventionally, a communications device may receive a list of 'carrier' frequencies to measure, from a serving network part (e.g. infrastructure equipment) and which may be specific to its serving cell and may or may not be specific to the communications device. The list of carrier frequencies may be accompanied by associated parameters such as priorities associated with each frequency and measurement and reporting thresholds.

Since terrestrial networks are generally static, the list of carrier frequencies typically does not vary over time and may be the same for all communications devices within the coverage area of the cell. Therefore, to minimize communications resources used to transmit the list of carrier frequencies, the list may be broadcast periodically in system information. Once a communications device has received the system information associated with its serving cell, it need not receive (or attempt to decode) the system information again while it is located within the coverage area of the serving cell if that stored system information remains valid. System information may generally provide information on the operation of the wireless communications network, particularly in the cell in which it is transmitted (or with which it is associated), and may be not specific to a particular communications device. System information may be broadcast according to a particular schedule, and thus may be received by multiple communications devices.

Alternatively, the list of carrier frequencies may be transmitted to a specific communications device while it is connected mode.

Exceptionally, in conventional terrestrial networks, system information may change (for example, because a new infrastructure equipment has been enabled, providing one or more new cells in the region of the serving cell). In order to trigger communications devices to refresh their stored system information, a paging message may be transmitted by the infrastructure equipment associated with the serving cell with an indication that the system information has changed. In response to receiving such an indication, the communications devices may receive and decode the updated system information.

Figure 3:
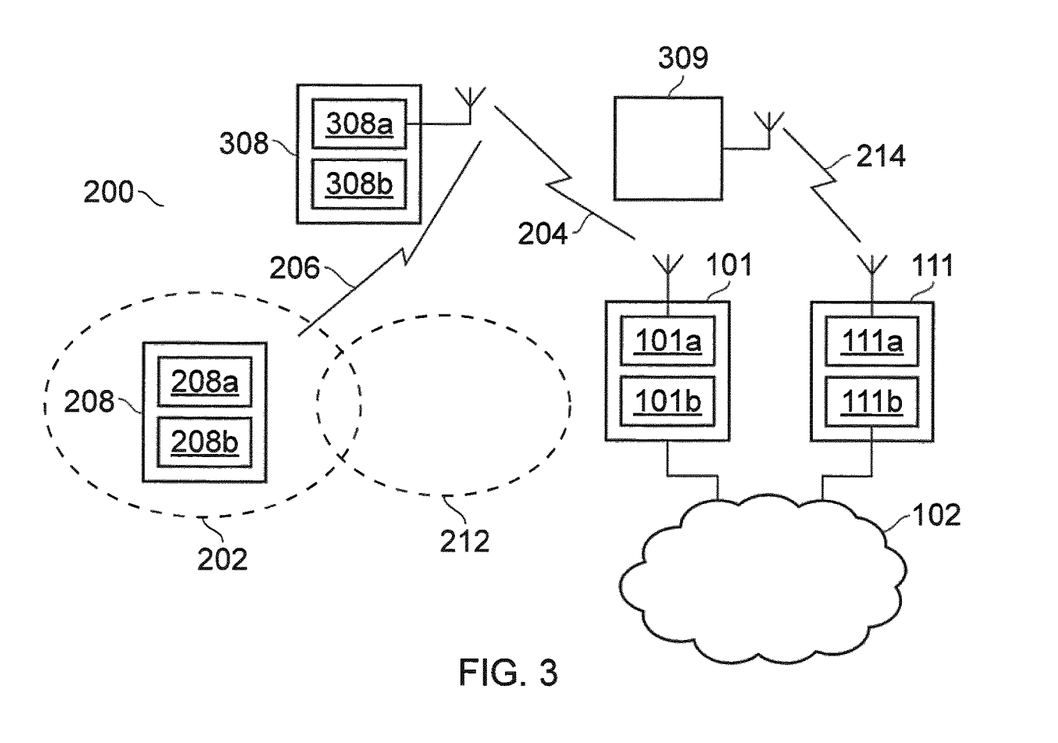
FIG. 3 schematically represents some example aspects of wireless telecommunication systems in accordance with embodiments of the present disclosure.

FIG. 3 schematically shows a wireless telecommunications system 200 according to an example embodiment of the present disclosure. The wireless telecommunications system 200 in this example is based broadly around an LTE-type or 5G-type architecture. Many aspects of the operation of the wireless telecommunications system/network 200 are known and understood and are not described here in detail in the interest of brevity. Operational aspects of the wireless telecommunications system 200 which are not specifically described herein may be implemented in accordance with any known techniques, for example according to the current LTE-standards or the proposed 5G standards.

The wireless telecommunications system 200 comprises a core network part 102 (which may be a 4G core network or a 5G core network) coupled to a radio network part. The radio network part comprises a base station (g-node B) 101 coupled to a non-terrestrial network part 308. The non-terrestrial network part 308 may be an example of infrastructure equipment.

The non-terrestrial network part 308 may be mounted on a satellite vehicle or on an airborne vehicle.

The non-terrestrial network part 308 is further coupled to a communications device 208, located within a cell 202, by means of a wireless access interface provided by a wireless communications link 206. For example, the cell 202 may correspond to the coverage area of a spot beam generated by the non-terrestrial network part 308.

The boundary of the cell 202 may depend on an altitude of the non-terrestrial network part 308 and a configuration of one or more antennas of the non-terrestrial network part 308 by which the non-terrestrial network part 308 transmits and receives signals on the wireless access interface.

The non-terrestrial network part 308 may be a satellite in an orbit with respect to the Earth, or may be mounted on such a satellite. For example, the satellite may be in a geo-stationary earth orbit such that the non-terrestrial network part 308 does not move substantially with respect to a fixed point on the Earth's surface. The geo-stationary earth orbit may be approximately 36,000 km above the Earth's equator. Alternatively, the satellite may be in an non-geo-stationary orbit, so that the non-terrestrial network part 308 moves with respect to a fixed point on the Earth's surface.

The non-terrestrial network part 308 may be an airborne vehicle such as an aircraft, or may be mounted on such a vehicle. The airborne vehicle (and hence the non-terrestrial network part 308) may be stationary with respect to the surface of the Earth (e.g. the non-terrestrial network part 308 may be attached to, or form part of a stationary balloon structure, the balloon structure tethered to a fixed point on the surface of the earth) or may move with respect to the surface of the Earth.

In FIG. 3, the base station 101 is shown as ground-based, and coupled to the non-terrestrial network part 308 by means of a wireless communications link 204. The non-terrestrial network part 308 receives signals representing downlink data transmitted by the base station 101 on the wireless communications link 204 and, based on the received signals, transmits signals representing the downlink data via the wireless communications link 206 providing the wireless access interface for the communications device 208. Similarly, the non-terrestrial network part 308 receives signals representing uplink data transmitted by the communications device 208 via the wireless access interface comprising the wireless communications link 206 and transmits signals representing the uplink data to the base station 101 on the wireless communications link 204.

In some embodiments, the wireless communications links 204, 206 operate at a same frequency; in some embodiments, the wireless communications links 204, 206 operate at different frequencies.

The extent to which the non-terrestrial network part 308 processes the received signals may depend upon a processing capability of the non-terrestrial network part 308. For example, the non-terrestrial network part 308 may receive signals representing the downlink data on the wireless communication link 204, amplify them and (if needed) re-modulate onto an appropriate carrier frequency for onwards transmission on the wireless access interface provided by the wireless communications link 206.

Alternatively, the non-terrestrial network part 308 may be configured to decode the signals representing the downlink data received on the wireless communication link 204 into un-encoded downlink data, re-encode the downlink data and modulate the encoded downlink data onto the appropriate carrier frequency for onwards transmission on the wireless access interface provided by the wireless communications link 206.

In some embodiments, the non-terrestrial network part 308 may be configured to perform some of the functionality conventionally carried out by the base station 101. In particular, latency-sensitive functionality (such as acknowledging a receipt of the uplink data, or responding to a RACH request in accordance with some embodiments of the present technique) may be performed by the non-terrestrial network part 308 instead of by the base station 101.

In some embodiments, the base station 101 may be co-located with the non-terrestrial network part 308; for example, both may be mounted on the same satellite vehicle or airborne vehicle, and there may be a physical (e.g. wired, or fibre optic) connection on board the satellite vehicle or airborne vehicle, providing the coupling between the base station 101 and the non-terrestrial network part 308. In some embodiments, a wireless communications link between the base station 101 and a ground station (not shown) may provide connectivity between the base station 101 and the core network part 102.

The communications device 208 shown in FIG. 3 may broadly correspond to the terminal device 104 of FIG. 1 or the terminal device 400 of FIG. 2. Additionally or alternatively, the communications device 208 may be configured to act as a relay node. That is, it may provide connectivity via a wireless access interface to one or more terminal devices, not shown in FIG. 3. The wireless access interface provided by the communications device 208 for the purposes of providing service and connectivity to terminal devices may comply substantially with the standards for a wireless access interface generated by a base station in accordance with standards, such as the LTE standard or a 5G standard. Data may thus be transmitted by a terminal device to the communications device 208 and by the communications device 208 to the terminal device in accordance with conventional techniques for transmission of data to a conventional base station or a conventional relay node.

It will be apparent that many scenarios can be envisaged in which the combination of the communications device 208 and the non-terrestrial network part 308 can provide enhanced service to end users. For example, the communications device 208 may be mounted on a passenger vehicle such as a bus or train which travels through rural areas where coverage by terrestrial base stations may be limited. Terminal devices on the vehicle may obtain service via the communications device 208 acting as a relay, which is coupled to the non-terrestrial network part 308.

There is a need to ensure that connectivity for the communications device 208 with the base station 101 can be maintained, as a result of movement of the communications device 208, movement of the non-terrestrial network part 308 (relative to the Earth's surface), or both. According to conventional cellular communications techniques, a decision to change a serving cell of the communications device 208 may be based on measurements of one or more characteristics of a radio frequency communications channel, such as signal strength measurements or signal quality measurements. In a terrestrial communications network, such measurements may effectively provide an indication that the communications device 208 is at, or approaching, an edge of a coverage region of a cell, since, for example, path loss may broadly correlate to a distance from a base station.

However, the inventors of the present technique have appreciated that such conventional mobility techniques may be unsuitable for communications devices served by cells generated by means of the transmission of beams from a non-terrestrial network part, such as the cell 202 generated by the non-terrestrial network part 308. In particular, where a large number of communications devices (such as the communications device 208) are located in close proximity, there may arise a need for mobility procedures to be completed within a short time duration.

A further disadvantage of conventional techniques may be the relatively high rate at which cell changes occur for the communications device 208 obtaining service from one or more non-terrestrial network parts. For example, where the non-terrestrial network part 308 is mounted on a satellite in a low-earth orbit (LEO), the non-terrestrial network part 308 may complete an orbit of the Earth in around 90 minutes; the coverage of a cell generated by the non-terrestrial network part 308 will move very rapidly, with respect to a fixed observation point on the surface of the earth.

Similarly, it may be expected that the communications device 208 may be mounted on an airborne vehicle itself, having a ground speed of several hundreds of kilometres per hour.

These disadvantages may be overcome by embodiments of the present technique, according to which an infrastructure equipment of the wireless telecommunications network receives a request to enter a connected mode from a communications device in a first cell; and in response to receiving the request, selects a second cell to be a next serving cell for the communications device and transmits an indication of an identity of the second cell to the communications device.

As shown in FIG. 3, the base station 101 comprises transceiver circuitry 101a (which may also be referred to as a transceiver/transceiver unit) for transmission and reception of wireless signals and processor circuitry 101b (which may also be referred to as a processor/processor unit) configured to control the base station 101 to operate in accordance with embodiments of the present disclosure as described herein. The processor circuitry 101b may comprise various sub-units/sub-circuits for providing desired functionality as explained further herein. These sub-units may be implemented as discrete hardware elements or as appropriately configured functions of the processor circuitry. Thus the processor circuitry 101b may comprise circuitry which is suitably configured/programmed to provide the desired functionality described herein using conventional programming/configuration techniques for equipment in wireless telecommunications systems. The transceiver circuitry 101a and the processor circuitry 101b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the non-terrestrial base station 101 will in general comprise various other elements associated with its operating functionality.

The non-terrestrial network part 308 comprises transceiver circuitry 308a (which may also be referred to as a transceiver/transceiver unit) for transmission and reception of wireless signals and processor circuitry 308b (which may also be referred to as a processor/processor unit) configured to control the non-terrestrial network part 308. The processor circuitry 308b may comprise various sub-units/sub-circuits for providing functionality as explained further herein. These sub-units may be implemented as discrete hardware elements or as appropriately configured functions of the processor circuitry. Thus the processor circuitry 308b may comprise circuitry which is suitably configured/programmed to provide the desired functionality using conventional programming/configuration techniques for equipment in wireless telecommunications systems. The transceiver circuitry 308a and the processor circuitry 308b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). As will be appreciated the non-terrestrial network part 308 will in general comprise various other elements associated with its operating functionality.

The communications device 208 comprises transceiver circuitry 208a (which may also be referred to as a transceiver/transceiver unit) for transmission and reception of wireless signals. The communications device 208 is configured to provide connectivity via the non-terrestrial network part 308. For example, the transceiver circuitry 208b may be adapted in accordance with the nature of the communications channel to the non-terrestrial network part 308, which may be characterized by a high path loss and an absence of multipath.

The communications device 208 further comprises processor circuitry 208b (which may also be referred to as a processor/processor unit) configured to control the communications device 208. The processor circuitry 208b may comprise various sub-units/sub-circuits for providing functionality as explained further herein. These sub-units may be implemented as discrete hardware elements or as appropriately configured functions of the processor circuitry. Thus the processor circuitry 208b may comprise circuitry which is suitably configured/programmed to provide the desired functionality using conventional programming/configuration techniques for equipment in wireless telecommunications systems. The transceiver circuitry 208a and the processor circuitry 208b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). As will be appreciated the communications device 208 will in general comprise various other elements associated with its operating functionality.

It will be appreciated that in practice the radio network part of the wireless communications network 200 may comprise a plurality of base stations and non-terrestrial network parts serving a larger number of communications devices across various communication cells.

As with a conventional mobile radio network, the communications device 208 is arranged to communicate data to and from the base station (transceiver station) 101. The base station 101 is in turn communicatively connected to one or more core network entities within the core network part 102. The core network part 102 may comprise an enhanced packet core (EPC) network and may comprise a serving gateway, S-GW (not shown for simplicity) which is arranged to perform routing and management of mobile communications services to the communications device 208 in the wireless telecommunications system 200 via the base station 101.

In order to maintain mobility management and connectivity, the core network part 102 may also include a mobility management entity (MME) (not shown for simplicity) which manages one or more enhanced packet service (EPS) connections with the communications device 208 operating in the communications system based on subscriber information stored in a home subscriber server (HSS). Other network components in the core network (not shown for simplicity) may include a policy charging and resource function (PCRF) and a packet data network gateway (PDN-GW) which provides a connection from the core network part 102 to an external packet data network, for example the Internet.

The core network part 102 may additionally or alternatively comprise one or more 5G core (5GC) network entities which collectively perform the functions of a 5GC network. The functions performed by the entities of the 5GC network may correspond broadly to the functions of the S-GW, MME, PCRF, PDN-GW and HSS of an enhanced packet core (EPC) as described above.

In addition, FIG. 3 shows a second non-terrestrial network part 309, coupled to a second base station 111 by means of a wireless communications link 214. The second non-terrestrial network part 309 and the second base station 111 may be substantially the same as the first non-terrestrial network part 308 and the first base station 101.

A second cell 212 is shown, corresponding to a coverage region provided by the second non-terrestrial network part 309.

The operation of the various elements of the wireless telecommunications system 200 shown in FIG. 3 may be broadly conventional apart from where modified to provide functionality in accordance with embodiments of the present disclosure as discussed herein.

Figure 4:
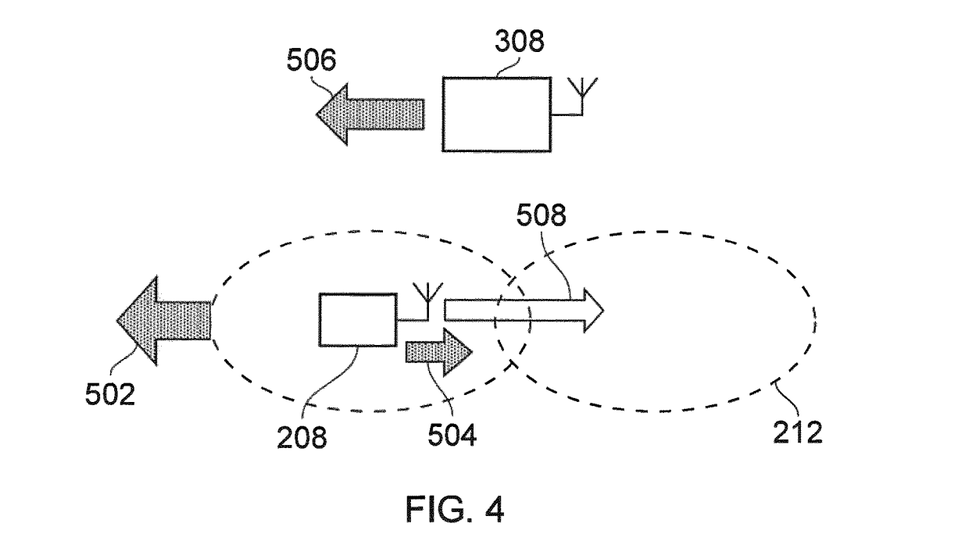
FIG. 4 illustrates a motion of a communications device, a non-terrestrial network part and cells, in accordance with embodiments of the present disclosure.

FIG. 4 illustrates a motion of the first non-terrestrial network part 308 (indicated by the arrow 506), resulting in a corresponding motion of the first cell 202, indicated by the arrow 502. At the same time, the communications device 208 may be moving, as indicated by the arrow 504. The arrows 502, 504, 506 represent movement relative to the surface of the Earth; for example, by reference to latitude and longitude. As described above, in some embodiments, the first non-terrestrial network part 308 may have a substantially geo-stationary earth orbit, such that there is substantially no movement of the cell 202 relative to the Earth's surface, even though the first non-terrestrial network part 308 may move, for example around a nominal position, relative to the Earth's surface.

The communications device 208 may be stationary (with respect to the Earth's surface) or moving.

As a result of the movement of one or both of the cell 202 and the communications device 208, there may arise movement of the communications device 208 relative to the cell 202, as indicated by the arrow 508.

Figure 5:
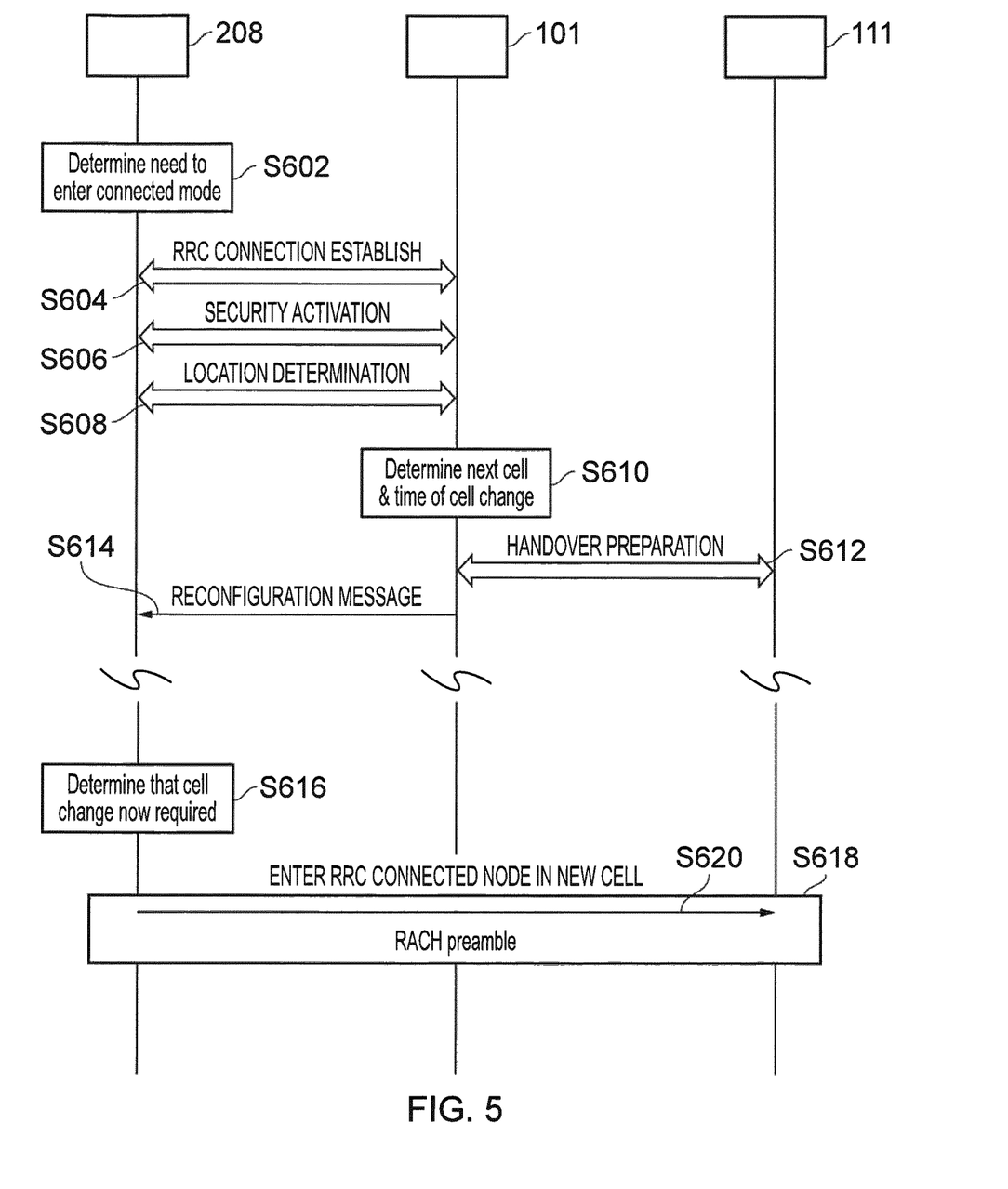
FIG. 5 is a process diagram and message sequence chart illustrating embodiments of the present disclosure.

FIG. 5 illustrates a combined process flow diagram and message sequence chart in accordance with embodiments of the present technique.

In FIG. 5, transmissions between the communications device 208 and the first and second base stations 101, 111 are shown; it will be appreciated that these may be via the first and second non-terrestrial network parts 308, 309 respectively, which are not shown in FIG. 5 for clarity.

Similarly, messages transmitted between the first and second base stations 101, 111 are shown as being transmitted directly between the base stations. In practice, however, these messages may traverse the core network part 102.

One or more steps may involve the transmission of messages having as their destination or source a core network entity (not shown for clarity). These may be received and transmitted by either the first or second base stations 101, 111, with a portion or all of their contents being passed transparently (i.e. not parsed or evaluated) by the first or second base stations 101, 111.

Initially, the communications device 208 is in an idle mode (such as RRC Idle) or inactive mode (such as RRC Inactive) in the cell 202.

The process illustrated in FIG. 5 starts at step S602, in which the communications device 208 determines that it is to enter a connected mode, such as the RRC connected mode. This determination may be in response to receipt of a paging message or a trigger from a non-access stratum (NAS) portion of the communications device 208. The trigger from the NAS portion of the communications device 208 may indicate a request for the establishment of a particular service from the core network part 102. The trigger and/or request may comprise an initial user equipment (UE) message for transmission to the core network part 102.

In response to the determination at step S602, then at step S604 the communications device 208 initiates a procedure to establish or resume an RRC connection.

For example, in response to the determination at step S602, then at step S604, if the communications device 208 is in the idle mode, then the communications device 208 may initiate an RRC connection establishment procedure.

If the communications device 208 is initially in the inactive mode then, in response to the determination at step S602, the communications device 208 may initiate at step S604 an RRC connection resume procedure by, for example, transmitting an RRC Connection Resume request message to the base station 101.

As a part of step S604, the communications device 208 may transmit the initial UE message to the base station 101.

Step S604 may be carried out in accordance with conventional techniques, such as comprising the transmission of an initial random access request comprising a RACH preamble by the communications device 208 to the base station 101, and forwarding (not shown in FIG. 5) of the initial UE message (which may have been received in a Message 3 of a random access procedure of step S604) from the communications device 208 to the core network part 102 by the first base station 101.

In some embodiments, there may follow step S606, in which a security activation is completed for the communications device 208. As part of step S606, the communications device 208 may verify the identity (i.e. authenticate) of the base station 101, and/or may receive an indication of one or more keys, and/or may receive an indication of one or more inputs for deriving a key or keys which can be subsequently used to verify an integrity of messages received from the base station 101. The key or keys may be additionally used to cipher or decipher information transmitted to or received from the base station 101.

In some embodiments, there may follow step S608, in which a location of the communications device 208 is determined by the first base station 101. In step S608, the first base station 101 may transmit measurement configuration information to the communications device 208, to request the communications device 208 to report one or more of its location, speed, direction and measurement results.

Accordingly in response (or in any case), the communications device 208 may report one or more of its location, speed, and direction. Alternatively or additionally, the communications device 208 may report the results of measurements of signals transmitted in the serving cell 202 and/or of signals transmitted in other cells, such as the second cell 212.

In some embodiments, the determination of the cell change time (as will be described below) is dominated by the change of coverage of the cells generated by spot beams of the first and second non-terrestrial network parts 308, 309 due to the movements of the respective non-terrestrial network parts. In such embodiments, the communications device 208 may report only its location (and not its speed or direction).

At step S610, the first base station 101 determines a next cell for the communications device 208, i.e. the cell which the communications device 208 should next select as its serving cell. In a conventional handover procedure, the determination of the next serving cell may be carried out immediately prior to the change of serving cell; that is, there is substantially no delay between the steps of determining the next cell and performing the handover procedure; indeed, the step of determining the next cell may be an integral step within the handover procedure. The handover procedure may be initiated, based on e.g. measurement reports, based on a determination that a need for the communications device 208 to change cell is imminent.

In embodiments of the present technique, however, the selection of the next cell may be in response to the entry (or request for entry) of the communications device 208 into connected mode, irrespective of whether or not a change of cell is imminently required.

In the example of FIG. 5, the determined next cell is the second cell 212.

Preferably, at step S610, the first base station 101 also determines a time of cell change, or a time window within which the cell change is to occur. This may be based on the determined location, speed and direction of the communications device 208. Where one or both of the first and second non-terrestrial network parts 308, 309 are not in a geostationary earth orbit, preferably the time or time window may be based on the change over time of the coverage region of the first cell 202 and/or second cell 212.

The change over time of the coverage region of a cell may be determined based on the location, orbital speed and direction of the non-terrestrial network part whose transmissions generate the cell.

For example, the first base station 101 may determine, based on a predicted path of the communications device 208 and the future coverage regions of the first and second cells 202, 212, that the communications device 208 will enter a region where the first and second cells 202, 212 overlap (i.e. where service may be obtained either from the first non-terrestrial network part 308 in the first cell 202, or from the second non-terrestrial network part 309 in the second cell 212) after t1 seconds.

The first base station 101 may further determine that the communications device 208 will leave the first cell 202 after t2 seconds. The first base station 101 may thus determine that a time window for the cell change begins in t1 seconds and closes in t2 seconds (i.e. the duration of the window is (t2−t1) seconds). In messages where a time or time window is indicated, the time or the beginning and/or end of a time window may be indicated in absolute time (e.g. based on coordinated universal time (UTC)), or relative to the transmission time of the respective message. The time window may be characterised by a start time and an end time, or a start time and a duration, or any other appropriate representation. A time period (used to indicate a duration of a time window, or a duration until a time is reached) may be indicated as a number of subframes, frames, slots or minislots or (if semi-persistent scheduling (SPS) is configured) a number of SPS allocations. A time may be indicated based on a frame number.

In some embodiments, for example where the first non-terrestrial network part 308 and second non-terrestrial network part 309 are in a geostationary earth orbit, the determination of the next cell and the time (or time window) for the cell change may be determined based on the (substantially unchanging) coverage region of the cells 202, 212 and the present location, speed and direction of the communications device 208 as determined in step S608.

At step S612, the first base station 101 initiates a handover preparation process, in which it transmits to a base station controlling the selected next cell a handover request to provide resources in advance of a cell change (i.e. handover) of the communications device 208.

In the example of FIG. 5, the next cell is the second cell 212 and the base station controlling the selected next cell is thus the second base station 111.

The handover request may include one or more of an indication of an identity of the selected next cell (i.e. the second cell 212), an indication of an identity of the communications device 208, an indication of the cell change time or time window and context associated with the communications device 208. The context may comprise security key information, identities, capabilities of the communications device 208 and the like.

In response to receiving the handover request, the second base station 111 may transmit a handover response message to the first base station 101. The handover response message may comprise an indication of a reserved RACH preamble to be used by the communications device 208 as part of the cell change procedure.

In some embodiments, no RACH transmission is required as part of the cell change procedure and no RACH preamble is reserved.

In some embodiments, the second base station 111 determines new security parameters to be used in the selected next cell and includes these in the handover response.

In some embodiments, the second base station 111 may determine a modified cell change time or cell change time window. For example, it may determine that there are no RACH preambles which are available for reservation during the entire time window proposed by the first base station 101. The second base station 101 may thus select a RACH preamble which is available for reservation for a portion of the proposed time window, and may indicate this selected RACH preamble and/or the modified time window (which may correspond to the portion of the proposed time window or a subset thereof).

At step S614, the first base station 101 transmits to the communications device 208 a reconfiguration message. The reconfiguration message may comprise one or more of:
- an indication of configuration parameters associated with the service requested by the NAS portion of the communications device 208;
- an indication of the identity of the selected second serving cell 212;
- an indication of the RACH preamble selected by the second base station 111 and indicated in the handover response message;
- the cell change time or cell change time window (as modified by the second base station 111, if applicable);
- new security parameters for use in the selected second serving cell 212.

In particular, in some embodiments, the reconfiguration message comprises both the indication of configuration parameters associated with the service requested by the NAS portion of the communications device 208 and the indication of the identity of the selected second serving cell 212.

The selected second serving cell 212 may be identified by one or more of a physical cell identity, a carrier frequency and a scrambling code or any other identifier relevant to the radio access technology according to which the second cell 212 operates.

The configuration parameters associated with the service requested by the NAS portion of the communications device 208 may comprise parameters associated with one or more bearers to be established to provide the service.

The reconfiguration message may be an RRC Reconfiguration message (if, for example, the communications device 208 was initially in the RRC Idle mode). Alternatively, the reconfiguration message may be an RRC Connection Resume message.

Following step S614, the communications device 208 is able to determine its next serving cell and a time (or time window) when it should select the next serving cell as its serving cell. The communications device 208 may also be able to determine a RACH preamble to be used as part of a procedure to select the next serving cell.

Similarly, following step S612, the second base station 111 has reserved the RACH preamble for the use of the communications device 208 in carrying out the cell change procedure to the next serving cell at the time or within the time window.

Unlike a conventional cell change procedure (whether handover or cell reselection), the details (time, identity of next cell, etc.) of the cell change have thus been determined in advance of, and independently of, the time at which the cell change is to occur. By decoupling the cell change preparation phase from the cell change, a signalling peak (whether on a wireless access interface or on an interface connecting base stations) resulting from large numbers of communications devices needing to change cell within a same short time window can be reduced or avoided.

Thus, as indicated by the break in the time lines, the next step S616 of the process occurs after, but independently of, the timing of the steps which have so far been described.

At step S616, the communications device 208 determines that the current time is equal to, or falls within the time or time window indicated in the reconfiguration and that a cell change is therefore now required.

In response to this determination, it initiates the cell change procedure of step S618 to the second cell 212.

Thus, the communications device enters the RRC connected mode in the second cell 212 at step S618. Step S618 may comprise a conventional procedure for changing cell, e.g. handover or cell reselection followed by RRC connection establishment.

The cell change procedure of step S618 may comprise a retuning of a receiver portion of the transceiver 208a to a carrier frequency associated with the second cell 212, and a synchronization procedure in which signals on the carrier frequency associated with the second cell 212 are received and processed to detect synchronization signals, such as a primary synchronization sequence and a second synchronization sequence. The communications device 208 may repeat the synchronization procedure if it is unable to detect synchronization signals corresponding to the indicated identity of the second cell 212.

In the example of FIG. 5, the cell change procedure of step S618 comprises a transmission at step S620, on the RACH of the second cell, of the preamble identified in the reconfiguration message. The second base station 111 may determine the identity of the communications device 208 based on the transmission at step S618 using the RACH preamble selected at step S612 and/or being at the time (or within the time window) determined at step S612.

During or subsequent to step S618, the communications device 208 may transmit data or control information to the second base station 111. In some embodiments, if new security parameters (e.g. security keys) were included in the reconfiguration message, then these are used for such data or control information transmissions.

In the example shown in FIG. 5 and described above, the first base station 101 determines the next serving cell i.e. the cell that the communications device 208 is to select as its next in-sequence serving cell after the cell (the first cell 202) controlled by the first base station 101.

In some embodiments of the present technique, a sequence of two or more future serving cells and (optionally) corresponding cell change times or time windows may be determined, and a selection step (broadly corresponding to step S610) and a preparation phase (broadly corresponding to step S612 described above) may be carried out (e.g. sequentially or substantially contemporaneously) in respect of each of the selected cells.

After the preparation phase has been completed for each selected cell, the reconfiguration message transmitted at step S614 may comprise, for each selected cell, one or more of:
  an indication of the configuration parameters associated with the requested service
  an indication of the identity of the selected cell;
  an indication of the RACH preamble for use in the selected cell;
  the cell change time or cell change time window for setting the selected cell as the serving cell;
  security parameters.

In some embodiments, each of the selected cells are determined by the first base station 101; steps S616 and S618 may therefore be repeated for each selected cell in sequence, initiated by the first base station 101.

In some embodiments, each of the selected cells are determined by the base station responsible for the previous cell in the sequence. For example, as in FIG. 5, the first selected cell is selected by the first base station 101. Subsequently, the second selected cell is selected by the second base station 111 (since it is the controlling base station for the first selected cell). A third selected cell may thus be selected by the base station which controls the second selected cell. Steps S616 and S618 may thus be repeated for each selected cell in sequence, initiated by the respective controlling base station of the cell in the sequence of cells starting with the current serving cell 202 and continuing with each successively selected cell. The result of each instance of step S612, when not initiated by the first base station 101, may be relayed to the first base station 101 by the second base station 111 and, where applicable, by subsequent base stations. By means of such relaying, the first base station 101 may thus receive information to be transmitted to the communications device 208 in respect of a sequence of future cells, even if there is no direct connection between the first base station 101 and one or more of the controlling base stations of the second or subsequently selected cells.

Because the communications device 208 receives information about multiple future cell changes in the reconfiguration message transmitted at step S614, the amount of signalling can be reduced. In particular, no cell change-related signalling needs to occur in cells where the next serving cell has already been determined and indicated to the communications device 208 while the communications device 208 was in a previous serving cell.

In step S612, the handover request message may be modified accordingly to indicate to the second base station 111 that not only has the second cell 212 been selected as the next serving cell for the communications device 208, but also that a further cell has been selected as a subsequent serving cell. The handover request message may indicate the identity of the further cell.

In response to receiving such a handover request, the second base station 111 may refrain from determining a cell to be a subsequent serving cell for the communications device 208. In some embodiments, the second base station 111 may refrain from performing any cell change procedure (e.g. preparation phase, or transmission to the communications device 208 of the identity of the further cell) if it determines that the further cell identified in the handover request in step S612 is appropriate, e.g. based on measurement reports, location/speed/direction reports received from the communications device 208.

The number of future cells that are selected may be determined by the first base station 101 based on one or more of an expected duration of a data transmission session or call, a required handover reliability and number of users in a geographical area.

For example, where an expected duration of a data transmission session or call is relatively short, such that the communications device 208 may likely leave the connected mode while in the next selected cell, the first base station 101 may refrain from selecting more than one next cell.

Because a trajectory of the communications device 208 may change over time, the probability of selecting an inappropriate next cell or time/time window for cell change increases as the number of future selected cells increases; therefore, where the required handover reliability is high, the first base station 111 may select a smaller number of next cells than where the required handover reliability is lower. For example, where the required reliability exceeds a predetermined threshold, the first base station 111 may select only one next cell.

Embodiments of the present technique may thus reduce the amount of signalling associated with cell change procedures compared with conventional techniques, thus mitigating the effect of a high number of communications devices being located within a small region, and (collectively) performing cell changes at a high frequency. In particular, when the number of users in a geographical area is high (e.g. above a predetermined threshold), the first base station 111 may select a higher number of next cells than when the number of users in a geographical area is lower than the threshold.

In the example of FIG. 5, the selected next cell (the second cell 212) and the current serving cell (the first cell 202) are generated by spot beams transmitted by different non-terrestrial network parts and controlled by different base stations. In some embodiments, the current serving cell and the selected next cell may be generated by spot beams transmitted by the same non-terrestrial network part and/or be controlled by the same base station.

Where the current serving cell and the selected next cell are controlled by the same base station then step S612 may comprise a determination by the controlling base station of the reserved RACH preamble and/or time/time window.

In some embodiments, the cell change procedure of step S618 does not require the transmission of a RACH preamble. In such embodiments, the handover response (of step S612) and reconfiguration message (of step S614) may instead indicate communications resources allocated for one or more transmissions by the communications device 208 in the next selected cell.

Additionally or alternatively, other configuration parameters applicable to communications (uplink, downlink or both) in the next selected cell may be included in the handover response (of step S612) and reconfiguration message (of step S614), for example, parameters related to grant-free operation.

In some embodiments of the present technique, the mobility procedure for the change of serving cell may provide continuity of service at the radio access network level by means of preparation of a 'target' base station associated with a next serving cell in advance of the cell change.

In some embodiments, continuity of service is provided only at the core network (NAS) level. In some embodiments, therefore, the target base station (e.g. the second base station 111) is not notified in advance of the cell change to be performed by the communications device 208.

For example, in some such embodiments, the first (serving) base station 101 may notify the communications device 208 of the identity of the next cell (e.g. the second cell 212) by means of a message which indicates that the present RRC connection is to be released. The communications device 208 may thus terminate the RRC connection when it selects the second cell 212 as its serving cell. Service continuity at the NAS/core network level may be provided by means of a NAS recovery procedure, carried out after the establishment of a new RRC connection in the second cell 212.

By the use of a connection release message, there can be thus avoided the need for a handover preparation phase, such that, for example, the step S612 of FIG. 5 could be omitted.

In the example of FIG. 5, both the first cell 202 and the second cell 212 are generated by spot beams transmitted by respective non-terrestrial network parts 308, 309, and both operate according to a common radio access technology. In some embodiments, one or both of the first cell 202 and the second cell 212 may be generated by spot beams transmitted by the same non-terrestrial network part (e.g. the first non-terrestrial network part 308).

In some embodiments, one or both of the first cell 202 and the second cell 212 may instead be generated by infrastructure equipment operating according to different radio access technologies, and/or one or both may be generated by terrestrial infrastructure equipment (e.g. comprising a ground-based base station). For example, the first cell 202 may operate according to a 5G radio access technology and be generated by a spot beam transmitted by the first non-terrestrial network parts 308, and the second cell 212 may be generated by a terrestrial infrastructure equipment operating according to one or more of a 2G, 3G or 4G radio access technology (e.g. global system for mobile communications (GSM), universal mobile telecommunications system (UMTS) or long term evolution (LTE) technologies, in accordance with the relevant standards).

Accordingly, the reconfiguration message or RRC connection release message may indicate an identity of a cell (for example, comprising an indication of a carrier frequency) which differs in some respect from the current serving cell in terms of whether the cell is terrestrial or not (and if not, a type of satellite, e.g. geostationary or non-geostationary), and the radio access technology used in the cell. For example, in some embodiments, an RRC connection release message transmitted to the communications device 208 in the first cell 202, where the first cell 202 is a non-terrestrial cell (i.e. generated by transmissions such as a spot beam of a non-terrestrial network part) may indicate a carrier frequency associated with another non-terrestrial cell, or a carrier frequency associated with a terrestrial cell such as an LTE or UMTS cell generated by transmissions of a ground-based base station and not including a non-terrestrial network part.

In the example illustrated in FIG. 3, both the first and second base stations 101, 111 are shown as being connected to the same core network part 102. However, in some embodiments (and in particular, where the radio access technologies of the first and second cells 202, 212 differ), each of the first and second base stations 101, 111 may be connected to a different core network part. In such embodiments, communications (such as the handover preparation step S612) may require messages to traverse both respective core network parts, via a link between them.

Thus there has been described a method for an infrastructure equipment of a wireless communications network, the method comprising receiving a request to enter a connected mode from a communications device in a first cell; and in response to receiving the request, selecting a second cell to be a next serving cell for the communications device and transmitting an indication of an identity of the second cell to the communications device.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base stations and the communications device. It will be appreciated such predetermined/predefined information may in general be established, for example, by definition in an operating standard for the wireless telecommunication system, or in previously exchanged signalling between the base stations and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein.

It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device or terminal device, for example the approaches are not limited to machine type communication devices/IoT devices or other narrowband communications devices, but can be applied more generally, for example in respect of any type communications device operating with a wireless link to the communication network.

It will further be appreciated that the principles described herein are not applicable only to LTE-based wireless telecommunications systems, but are applicable for any type of wireless telecommunications system or systems that support mobility between a cell generated by a non-terrestrial network part and a cell generated by a terrestrial base station.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method for an infrastructure equipment of a wireless communications network, the method comprising: receiving a request to enter a connected mode from a communications device in a first cell; and in response to receiving the request, selecting a second cell to be a next serving cell for the communications device and transmitting an indication of an identity of the second cell to the communications device.

Paragraph 2. A method according to paragraph 1, the method comprising: transmitting, with the indication of the identity of the second cell, parameters associated with one or more bearers to be established for the communications device.

Paragraph 3. A method according to paragraph 1 or paragraph 2, the method comprising: in response to receiving the request, determining a cell change time or a cell change time window when the communications device is to select the second cell as its serving cell; and transmitting, with the indication of the identity of the second cell, an indication of the cell change time or the cell change time window.

Paragraph 4. A method according to any of paragraphs 1 to 3, the method comprising: determining a location of the communications device, wherein the second cell is selected based on the determined location.

Paragraph 5. A method according to any of paragraphs 1 to 4, the method comprising: in response to receiving the request, selecting a third cell to be a serving cell for the communications device, the third cell to be the serving cell for the communications device after the second cell, and transmitting with the indication of the identity of the second cell an indication of the identity of the third cell to the communications device.

Paragraph 6. A method according to any of paragraphs 1 to 5, wherein the first cell is generated by a spot beam of a non-terrestrial network part forming an area within which radio signals can be transmitted to and received by the non-terrestrial network part or transmitted from the non-terrestrial network part and received within the area formed by the spot beam.

Paragraph 7. A method according to paragraph 6, wherein the non-terrestrial network part is in a non-geostationary earth orbit.

Paragraph 8. A method according to paragraph 6 or paragraph 7, wherein the coverage region of the first cell moves with respect to the surface of the Earth.

Paragraph 9. A method according to any of paragraphs 1 to 8, wherein the indication of the identity of the second cell is transmitted within a radio resource control, RRC, reconfiguration message.

Paragraph 10. A method according to any of paragraphs 1 to 9, wherein the request to enter the connected mode comprises a request to establish an RRC connection.

Paragraph 11. A method according to any of paragraphs 1 to 9, wherein the request to enter the connected mode comprises a request to resume an RRC connection.

Paragraph 12. A method for a communications device in a wireless communications network, the method comprising: transmitting in a first cell a request to enter a connected mode to an infrastructure equipment of the wireless communications network; and receiving an indication of an identity of a second cell to be a next serving cell for the communications device, the indication of the identity of the second cell transmitted by the infrastructure equipment in response to receiving the request.

Paragraph 13. A method according to paragraph 12, the method comprising: receiving, with the indication of the identity of the second cell, parameters associated with one or more bearers to be established for the communications device.

Paragraph 14. A method according to paragraph 12 or paragraph 13, the method comprising: receiving, with the indication of the identity of the second cell, an indication of a cell change time or a cell change time window when the communications device is to select the second cell as its serving cell.

Paragraph 15. A method according to any of paragraphs 12 to 14, the method comprising: determining a location of the communications device, and before receiving the indication of the identity of the second cell, transmitting an indication of the determined location to the infrastructure equipment.

Paragraph 16. A method according to any of paragraphs 12 to 15, the method comprising: receiving from the infrastructure equipment, with the indication of the identity of the second cell, an indication of an identity of a third cell to be a serving cell for the communications device, the third cell to be the serving cell for the communications device after the second cell Paragraph 17. A method according to any of paragraphs 12 to 16, wherein the first cell is generated by a spot beam of a non-terrestrial network part.

Paragraph 18. A method according to paragraph 17, wherein the non-terrestrial network part is in a non-geostationary earth orbit.

Paragraph 19. A method according to paragraph 17 or paragraph 18, wherein the coverage region of the first cell moves with respect to the surface of the Earth.

Paragraph 20. A method according to any of paragraphs 12 to 19, wherein the indication of the identity of the second cell is transmitted within a radio resource control, RRC, reconfiguration message.

Paragraph 21. A method according to any of paragraphs 12 to 20, wherein the request to enter the connected mode comprises a request to establish an RRC connection.

Paragraph 22. A method according to any of paragraphs 12 to 20, wherein the request to enter the connected mode comprises a request to resume an RRC connection.

Paragraph 23. A method for an infrastructure equipment of a wireless communications network, the method comprising: selecting a second cell generated by a non-terrestrial network part to be a next serving cell for a communications device which has a connection with the infrastructure equipment, and transmitting a message indicating that the connection is to be released, the message comprising an indication of an identity of the second cell.

Paragraph 24. A method according to paragraph 23, wherein the connection with the infrastructure equipment is in a cell generated by a non-terrestrial network part.

Paragraph 25. A method according to paragraph 23, wherein the infrastructure equipment is a terrestrial infrastructure equipment.

Paragraph 26. A method for a communications device having a connection with an infrastructure equipment of a wireless communications network, the method comprising: receiving a message from the infrastructure equipment indicating that the connection is to be released, the message comprising an indication of an identity of a second cell to be a next serving cell for the communications device, the second cell generated by a non-terrestrial network part.

Paragraph 27. A method according to paragraph 26, wherein the connection with the infrastructure equipment is in a cell generated by a non-terrestrial network part.

Paragraph 28. A method according to paragraph 26, wherein the infrastructure equipment is a terrestrial infrastructure equipment.

Paragraph 29. Infrastructure equipment of a wireless communications network, the wireless communications network comprising a non-terrestrial network part, wherein the infrastructure equipment comprises controller circuitry and transceiver circuitry configured such that the infrastructure equipment is operable: to receive a request to enter a connected mode from a communications device in a first cell; and in response to receiving the request, to select a second cell to be a next serving cell for the communications device and to transmit an indication of an identity of the second cell to the communications device.

Paragraph 30. Integrated circuitry for infrastructure equipment of a wireless communications network, the wireless communications network comprising a non-terrestrial network part, wherein the integrated circuitry comprises controller circuitry and transceiver circuitry configured to operate together such that the infrastructure equipment is operable: to receive a request to enter a connected mode from a communications device in a first cell; and in response to receiving the request, to select a second cell to be a next serving cell for the communications device and to transmit an indication of an identity of the second cell to the communications device.

Paragraph 31. Infrastructure equipment of a wireless communications network, the wireless communications network comprising a non-terrestrial network part, wherein the infrastructure equipment comprises controller circuitry and transceiver circuitry configured such that the infrastructure equipment is operable: to select a second cell generated by a non-terrestrial network part to be a next serving cell for a communications device which has a connection with the infrastructure equipment, and to transmit a message indicating that the connection is to be released, the message comprising an indication of an identity of the second cell.

Paragraph 32. Integrated circuitry for infrastructure equipment of a wireless communications network, the wireless communications network comprising a non-terrestrial network part, wherein the integrated circuitry comprises controller circuitry and transceiver circuitry configured to operate together such that the infrastructure equipment is operable: to select a second cell generated by a non-terrestrial network part to be a next serving cell for a communications device which has a connection with the infrastructure equipment, and to transmit a message indicating that the connection is to be released, the message comprising an indication of an identity of the second cell.

Paragraph 33. A communications device for use in a wireless communications network, wherein the communications device comprises controller circuitry and transceiver circuitry configured such that the communications device is operable: to transmit in a first cell a request to enter a connected mode to an infrastructure equipment of the wireless communications network; and to receive an indication of an identity of a second cell to be a next serving cell for the communications device, the indication of the identity of the second cell transmitted by the infrastructure equipment in response to receiving the request.

Paragraph 34. Integrated circuitry for a communications device for use in a wireless communications network, wherein the integrated circuitry comprises controller circuitry and transceiver circuitry configured to operate together such that the communications device is operable: to transmit in a first cell a request to enter a connected mode to an infrastructure equipment; and to receive an indication of an identity of a second cell to be a next serving cell for the communications device, the indication of the identity of the second cell transmitted by the infrastructure equipment in response to receiving the request.

Paragraph 35. A communications device for use in a wireless communications network, wherein the communications device comprises controller circuitry and transceiver circuitry configured such that when the communications device has a connection with an infrastructure equipment of the wireless communications network, the communications device is operable to receive a message from the infrastructure equipment indicating that the connection is to be released, the message comprising an indication of an identity of a second cell to be a next serving cell for the communications device, the second cell generated by a non-terrestrial network part.

Paragraph 36. Integrated circuitry for a communications device for use in a wireless communications network, wherein the integrated circuitry comprises controller circuitry and transceiver circuitry configured to operate together such that when the communications device has a connection with an infrastructure equipment of the wireless communications network, the communications device is operable: to receive a message from the infrastructure equipment indicating that the connection is to be released, the message comprising an indication of an identity of a second cell to be a next serving cell for the communications device, the second cell generated by a non-terrestrial network part.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP TR 38.811 "Study on New Radio (NR) to support non terrestrial networks (Release 15)", December 2017
[2] Holma H. and Toskala A, "LTE for UMTS OFDMA and SC-FDMA based radio access", John Wiley and Sons, 2009

What is claimed is:

1. A method for an infrastructure equipment of a wireless communications network, comprising:
receiving a request to enter a connected mode from a communications device in a first cell; and
in response to receiving the request,
selecting, independently of a time at which cell reselection is to occur, a second cell to be a next serving cell for the communications device based on at least a direction of movement of the communications device, and
transmitting an indication of an identity of the second cell to the communications device.

2. The method according to claim 1, comprising:
transmitting, with the indication of the identity of the second cell, parameters associated with one or more bearers to be established for the communications device.

3. The method according to claim 1, comprising:
in response to receiving the request, determining a cell change time or a cell change time window when the communications device is to select the second cell as its serving cell; and
transmitting, with the indication of the identity of the second cell, an indication of the cell change time or the cell change time window.

4. The method according to claim 1, comprising:
determining a location and the direction of movement of the communications device, wherein
the second cell is selected based on the determined location and the direction of movement.

5. The method according to claim 1, comprising:
in response to receiving the request,
selecting a third cell to be a serving cell for the communications device, the third cell to be the serving cell for the communications device after the second cell, and
transmitting with the indication of the identity of the second cell an indication of the identity of the third cell to the communications device.

6. The method according to claim 1, wherein the first cell is generated by a spot beam of a non-terrestrial network part forming an area within which radio signals can be transmitted to and received by the non-terrestrial network part or transmitted from the non-terrestrial network part and received within the area formed by the spot beam.

7. The method according to claim 1, wherein the indication of the identity of the second cell is transmitted within a radio resource control (RRC) reconfiguration message.

8. The method according to claim 1, wherein the request to enter the connected mode comprises a request to establish an RRC connection.

9. The method according to claim 1, wherein the request to enter the connected mode comprises a request to resume an RRC connection.

10. A method for a communications device in a wireless communications network, comprising:
transmitting in a first cell a request to enter a connected mode to an infrastructure equipment of the wireless communications network;
transmitting at least a direction of movement of the communications device to the infrastructure equipment; and
receiving an indication of an identity of a second cell to be a next serving cell for the communications device, the indication of the identity of the second cell transmitted the infrastructure equipment in response to receiving the request, is based on the direction of movement of the communications device, and is independent of a time at which cell reselection is to occur.

11. The method according to claim 10, comprising:
receiving, with the indication of the identity of the second cell, parameters associated with one or more bearers to be established for the communications device.

12. The method according to claim 10, comprising:
receiving, with the indication of the identity of the second cell, an indication of a cell change time or a cell change time window when the communications device is to select the second cell as its serving cell.

13. The method according to claim 10, comprising
determining a location of the communications device, and
before receiving the indication of the identity of the second cell, transmitting an indication of the determined location to the infrastructure equipment.

14. The method according to claim 10, comprising:
receiving from the infrastructure equipment, with the indication of the identity of the second cell, an indication of an identity of a third cell to be a serving cell for the communications device, the third cell to be the serving cell for the communications device after the second cell.

15. The method according to claim 10, wherein the first cell is generated by a spot beam of a non-terrestrial network part.

16. The method according to claim 10, wherein the indication of the identity of the second cell is transmitted within a radio resource control (RRC) reconfiguration message.

17. The method according to claim 10, wherein the request to enter the connected mode comprises a request to establish an RRC connection.

18. The method according to claim 10, wherein the request to enter the connected mode comprises a request to resume an RRC connection.

* * * * *